United States Patent Office 2,884,767
Patented May 5, 1959

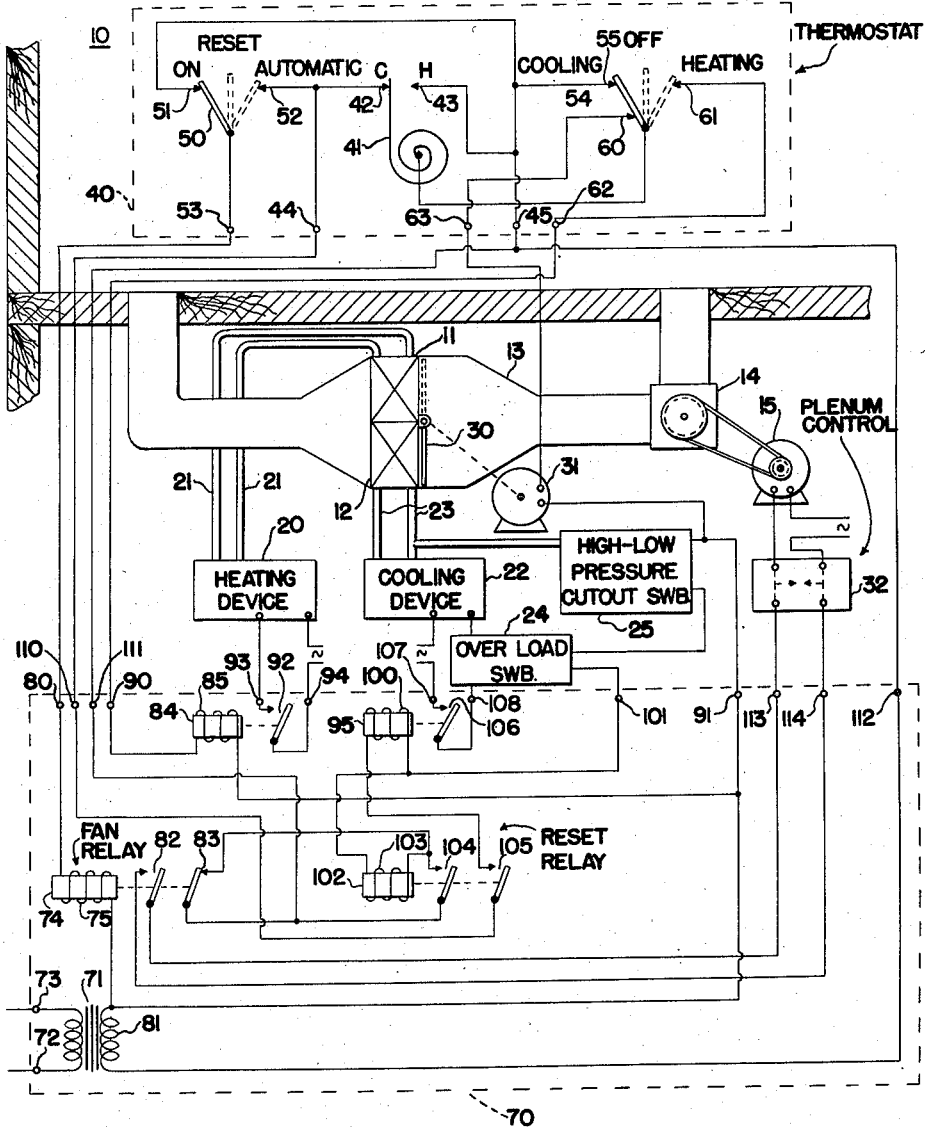

2,884,767
CONTROL APPARATUS

Alden J. Ritter, Elyria, and Warren H. Scott, Parma Heights, Ohio; said Scott assignor to Minneapolis-Honeywell Regulator Company, Minneapolis, Minn., a corporation of Delaware, and said Ritter assignor to The C. A. Olsen Manufacturing Co., Elyria, Ohio, a corporation of Delaware Application June 21, 1956, Serial No. 592,906

4 Claims. (Cl. 62—161)

The present invention is concerned with an improved control circuit for an air conditioning system in particular, a control circuit having a resettable safety circuit associated with cooling apparatus which is reset upon de-energization of the control circuit of a fan, thus a remotely located switch and circuit associated therewith connected to the fan control circuit is also used to control the resettable circuit.

In air conditioning systems wherein refrigeration apparatus is used safety circuits are needed to shut down the refrigeration apparatus should an abnormal condition exist. Normally overload switches are used which sense the presence of an excessive input current to the refrigeration motor and pressure cutout switches are used which sense the pressure level of the refrigerant in the refrigeration system. The pressure cutout switches normally open a circuit when there is an excessive pressure or too low a pressure in the refrigeration system. These overload switches and the pressure cutoff switches are generally connected into the motor control circuit of the refrigeration apparatus. When an abnormal condition takes place a holding circuit on a main control relay is broken so that the relay is de-energized and the refrigeration apparatus shut down.

It is conventional practice to have a switch connected in the energization circuit of the mentioned relay in parallel with the holding circuit so that after the occurrence of this abnormal condition the system can be restored to operation. The switch mentioned is generally labeled "reset" and while it can be mounted in the control panel for the refrigeration apparatus it is often placed in a remote location such as on the room thermostat.

With the conventional reset circuits of the prior art considerable amount of circuitry is generally needed to provide an automatic resetting of the control circuit after power failure. Such is quite important as in a domestic air conditioning installation to have a power failure while the occupants of the residence were away would result in no cooling until the control circuit was reset. The occupants would return to a warm dwelling and the control apparatus would be placed in operation by closing the reset circuit, this being an undesirable feature.

In the present invention the reset circuit has its switch or "reset button" as an out or normally closed contact on the fan relay. Whenever the reset circuit needs to be energized the fan relay is momentarily de-energized so that the reset switch will close and thereafter energization is maintained through a holding circuit. With such an improved circuit the fan relay is connected to a remote switch on the thermostat so that selective operation of the fan can be obtained. The fan switch also acts as a reset switch, that is, should the control circuit for the refrigeration apparatus need re-energization or resetting the remotely located fan switch is momentarily opened so that the fan relay is deenergized.

The present invention further has the advantage of automatic reset on power failure. Should the refrigeration apparatus as well as the fan be de-energized upon a power failure the fan relay would be in a position to provide for a re-energization of the refrigeration circuit when power is restored.

It is therefore an object of the present invention to provide an improved air conditioning control circuit;

Another object of the present invention is to provide an improved reset circuit for use with air conditioning refrigeration apparatus;

And still another object of the present invention is to provide an improved reset circuit for use in refrigeration apparatus of an air conditioning system, the energization circuit for the reset circuit being established when a fan control circuit is de-energized.

These and other objects will become apparent upon a study of the following specification and drawing of which:

A single figure is a schematic diagram of the air conditioning system control circuit.

A space 10 is conditioned by the circulation of air through either a heating coil 11 or a cooling coil 12, mounted in air duct 13, by means of a fan 14. The fan has a conventional motor 15 connected thereto. Connected to the heating coil is a heating device 20 which might be any suitable furnace or boiler for supplying hot water through pipes 21 to the coil. Connected to coil 12 is a cooling device 22 which might be any sort of cooling apparatus for supplying a cooling medium through pipes 23 to the coil. Abnormal condition responsive devices such as an overload switch 24 responsive to the input current to the cooling device and a high-low pressure cutout switch 25 responsive to the pressures developed by the cooling device provides for proper operation of cooling device 22. While it is obvious that high-low pressure cutoff switches and overload switches of this sort are used with refrigeration cooling apparatus it is obvious to any one skilled in the art that any device for sensing abnormal conditions for such a cooling device as used would accomplish the overall purpose.

A damper 30 shown covering cooling coil 12 is positioned by motor 31 so that when heating is desired it is as shown and when cooling is desired the damper is moved to cover heating coil 11. Fan motor 15 is connected to a source of power through a plenum control 32 which is a conventional type responsive to the temperature near heating coil 11 to provide operation of the fan only when the heating coil is up to some predetermined temperature.

In space 10, a thermostat 40 has a temperature responsive element 41 which alternatively contacts a cold or hot contact 42 and 43, respectively depending upon the temperature of the space. Contact 42 is connected to a terminal 44 on the thermostat. Contact 43 is connected to a terminal 45. A fan switch has a movable member 50 selectively engaging an on contact 51 or an automatic contact 52 to provide either continuous operation of the fan or automatic operation of the fan, that is, from the plenum control during heating or whenever the cooling device is energized on cooling. Contact 51 is connected to terminal 45 and contact 52 is connected to terminal 44. Movable member 50 is connected to a terminal 53. A selector switch for selecting either heating or cooling has a movable member 54 which engages simultaneously contacts 55 and 60 when in the cooling position and a contact 61 when in the heating position. When the movable member is in an intermediate position between the heating and cooling positions neither heating nor cooling is obtained. Contact 55 is connected to terminal 45 and contact 61 is connected to a terminal 62. Contact 60 is connected to a terminal 63 and movable member 54 is connected to bimetal 41. It is obvious that the thermostat housing need not contain the mentioned fan and condition selector switches in addition to the temperature responsive element 41; however, for convenience these switches are so located thus the occupants of the dwelling are able to control the air conditioning apparatus from the living quarters.

Panel 70 which would generally be located in the basement or near the heating and cooling devices has a source of power or transformer 71 having its primary winding connected to terminals 72 and 73 adapted to be connected to an external source of power. A fan relay 74 has a winding 75 connected between a terminal 80 of the panel and an upper end terminal of secondary winding 81 of the source of power. The fan relay has a normally open switch 82 and a normally closed switch 83 associated therewith. A heating relay 84 has a winding 85 connected between terminal 90 of the panel and terminal 91 which is connected to the upper extremity of secondary 81. Relay 84 has a switch 92 associated therewith which is connected through terminals 93 and 94 of the panel to the heating device so that upon energization of relay 84 the heating device is energized.

A cooling relay 95 has a winding 100. The abnormal condition responsive devices 24 and 25 have the control circuit portions thereof connected between terminals 101 and 91 of the panel so that upon the occurrence of an overload or a pressure cutout the circuit between the mentioned terminals will be opened. A reset relay 102 has a winding 103. Reset relay 102 has a pair of normally open switches 104 and 105. Switch 104 makes up a holding circuit for relay 102. Winding 100 has one extremity connected to terminal 101 and the other extremity connected through switch 105 to a terminal 110 of the panel. Winding 103 of the reset relay is connected between terminal 101 and terminal 111 through a circuit traced as follows; terminal 101, winding 103, switches 83 and 104 connected in parallel, and terminal 111. The lower extremity of the secondary 81 is connected to terminal 112 of the panel. Switch 82 is connected in parallel with the plenum control through terminals 113 and 114 of the panel. A switch 106 associated with relay 95 is connected through terminals 107 and 108 to the cooling device.

Panel terminals 80, 110, 111 and 90 are connected to thermostat terminals 53, 44, 45 and 62, respectively. Panel terminal 112 is also connected to thermostat terminal 45. Motor 31 for controlling damper 30 is connected between terminal 63 of the thermostat and terminal 91 of the panel.

*Operation*

The control system is shown de-energized with the fan selector switch in the on or continuous position and the condition selector switch in the cooling position. Let us assume that power is connected to terminals 72 and 73 of the panel as well as to the heating device, cooling device and the fan motor, as shown. Let us further assume that the abnormal condition responsive switches 24 and 25 are closed so that the circuit between terminals 91 and 101 is closed, this being the case when no abnormal pressure exists as sensed by switch 25 and no overload is present as sensed by switch 24.

Reset relay 102 is energized through a circuit from the upper extremity of secondary 81, terminal 91, terminal 101, winding 103, switch 83, terminal 111, and back to the source of power through terminal 112. Switch 83 is closed even though fan relay 74 is also simultaneously energized with reset relay 102. The relays are so designed that the holding circuit comprising switch 104 of the reset relay closes soon enough to maintain energization of reset relay 102 even though switch 83 begins to open soon thereafter. This is quite common in such simultaneously energized relays and is prevented by mechanically lagging one relay. As mentioned switch 104 forms a holding circuit for reset relay 102 to maintain its energization even though fan relay 74 is energized through the circuit from the upper extremity of secondary 81, winding 75, terminal 80, terminal 53, terminal 45 and back to the source of power through terminal 112. Switch 82 which is connected in parallel with the plenum control energizes fan motor 15 to begin operation of the fan.

The cooling device 22 is energized as cooling relay 95 is energized through a circuit traced from the upper extremity of secondary 81, terminal 91, terminal 101, winding 100, switch 105, terminal 44, bimetal 41, contact 54, terminal 45 and back to the source of power through terminal 112. Whenever the termostat 41 is satisfied and the bimetal moves away from the contact 42 the cooling relay 95 is de-energized to shut down the cooling device 22.

Let us assume that we get an abnormal condition in the cooling device such as a high or low pressure existing in the refrigeration apparatus as sensed by switch 25 or an excessive input current as sensed by the overload switch 24. The circuit between terminals 91 and 101 is broken to de-energize the reset relay and thus open switch 105 to de-energize the cooling relay 95. Normally the abnormal condition existing at the time of shutdown will soon pass away in a short period of no operation of the cooling device 22. To reset the apparatus and thus restore it to proper operation, the reset relay need again be energized by closing its energization circuit through the switch 83. This is done by momentarily de-energizing the fan relay 74 by the fan selector switch in the thermostat. Member 50 is moved to the position between the automatic and on contacts, shown as reset, and the fan relay is de-energized to close switch 83. This re-establishes energization of the reset relay and closes its holding switch 104 to again re-establish energization of cooling relay 95 through switch 105.

The reset circuit comprises a minimum number of relays and uses a common circuit to the remote switch which is used for both fan selection and reset operation. This has its advantage in that less wires need to be strung from the panel 70 to the remotely located thermostat 40. Furthermore it was shown upon the initial energization of the circuit automatic reset is obtained. Upon a power failure a similar mode of operation takes place so that operation is restored upon power restoration. It is apparent that automatic resetting action is obtained upon a power failure with a relatively simple circuit and yet the cooling device is protected so that operation is interrupted upon abnormal conditions developing.

When the selector switch is thrown to the heating position so that member 54 engages the heating contact 61 the heating device is energized when the bimetal 41 engages contact 43. During the heating operation the reset relay is not used and the operation of the fan can either be continuous with member 50 engaging contact 51 or automatic, that is, off of the plenum control 32 when member 50 engages contact 52.

Should the fan switch be placed in a position so that member 50 engages contact 52 upon a return to cooling by moving member 54 to engage contacts 55 and 60 automatic reset of the reset relay 102 is provided as the fan relay 74 would be simultaneously energized with the reset relay 102. Let us assume that the movable member 50 was in a position to engage contact 51 during the heating operation, and continuous fan operation was provided. Upon a transfer to cooling the fan relay is already energized and switch 83 is open. Thus to re-establish operation of the cooling device upon a transfer from heating to cooling with the previous continuous operation of the fan, it is necessary to reset the system by moving the movable member 50 to the reset position to momentarily de-energize relay 74 and thus close switch 83.

While the present invention has been shown in some detail as applied to an air conditioning system it is obvious that other types of apparatus could be associated with the present invention, thus it is intended that the scope of the present invention be limited only by the appended claims.

We claim:

1. In control apparatus, a heat exchanger, a cooling device for supplying a quantity of cooled medium to said exchanger, a fan for circulating air from a space through said heat exchanger to cool the space, first actuator means having a switch associated therewith, circuit means connecting said switch to control the operation of said cooling device, second actuator means having a first and second switches associated therewith, said second switch being normally closed when said second actuator means is de-energized, circuit means connecting said first switch of said second actuator to control the operation of said fan, condition responsive means responsive to the existence of abnormal conditions existing in the operation of said cooling device, said responsive means having a circuit which is opened upon the presence of said abnormal conditions, third actuator means having a first and second switches associated therewith, said first switch of said third actuator means being normally open when said third actuator means is de-energized, temperature responsive means associated with said space and providing a closed circuit when there is a need for cooling in said space, a source of power, a remotely located switch, circuit means connecting said second actuator means to said source of power through said remote switch to provide for selective energization of said second actuator means, circuit means connecting said first actuator means to said source of power through a circuit comprising, said second switch of said third actuator means, said space temperature means, and said circuit of said condition responsive means; and circuit means connecting said third actuator means to said source of power through a circuit comprising, said circuit of said condition responsive means, and said second switch of said second actuator means or said first switch of said third actuator means, said last mentioned first and second switches being connected in parallel.

2. Control apparatus for controlling the operation of a cooling device furnishing a quantity of cooled medium to a heat exchanger, air from a space being circulated through the heat exchanger by a fan, the cooling device having a safety device providing an open circuit when abnormal operation conditions exist comprising; first relay means adapted to control the operation of the cooling device; second relay means adapted to control the operation of the fan, said second relay means having a switch normally closed when said second relay means is de-energized; a remote control switch; third relay means having a first and second switches normally open when said third relay means is de-energized; a source of power; first circuit means including said control switch connecting said second relay means to said source of power; second circuit means including said second switch of said third relay means for connecting said first relay means to said source of power, a normally closed switch of said second relay means and said first switch of said third relay means being connected in a parallel circuit, and third circuit means adapted to connect a circuit comprising said third relay means, said parallel circuit, said switch on said second relay means, and said source of power to the circuit of the safety device however before said third relay means can be energized through said last mentioned circuit said control switch must be opened to de-energize said second relay.

3. Control apparatus for controlling the operation of a cooling device and a circulation device circulating a medium through the cooling device, comprising, first actuator means adapted to control the operation of the cooling device, a source of power, second actuator means adapted to control the circulation device, said second actuator means having a switch associated therewith, switch means, remote circuit means including said switch means selectively connecting said second actuator means to said source of power, a resettable actuator means having a switch and a holding circuit associated therewith, said holding circuit maintaining energization of said resettable actuator means when said resettable actuator means is energized, circuit means including said switch of said resettable actuator means for connecting said first actuator to said source of power, circuit means connecting said resettable actuator means to said source of power through said switch of said second actuator thus upon the de-energization of said second actuator means by opening said remote switch means said resettable actuator means is energized.

4. In control apparatus adapted to control the operation of cooling apparatus and a fan, first actuator means adapted to control the operation of the cooling apparatus, second actuator means adapted to control the fan, said second actuator means having a first switch normally closed when said second actuator means is de-energized, third actuator means having an energization circuit, a holding circuit, and a second switch for providing a closed circuit when said third actuator means is energized, said holding circuit maintaining energization of said energization circuit after it is initially energized, a source of power, a remotely located switch, first circuit means including said remote switch connecting said second actuator means to a source of power, second circuit means including said second switch for connecting said first actuator means to said source of power, and circuit means connecting said first switch in said energization circuit of said third actuator means to initiate energization thereof when said second actuator means is de-energized upon said remotely located switch being opened.

References Cited in the file of this patent

UNITED STATES PATENTS

| | | |
|---|---|---|
| 1,961,802 | Taylor | June 5, 1934 |
| 2,188,877 | Kriechbaum | Jan. 30, 1940 |
| 2,245,369 | Smith | June 10, 1941 |
| 2,389,073 | Newton | Nov. 13, 1945 |
| 2,440,700 | Rosche | May 4, 1948 |
| 2,561,067 | Newton | July 17, 1951 |